US009017079B2

(12) United States Patent
Nojima

(10) Patent No.: US 9,017,079 B2
(45) Date of Patent: Apr. 28, 2015

(54) INFORMATION NOTIFICATION APPARATUS THAT NOTIFIES INFORMATION OF DATA OF MOTION

(71) Applicant: Casio Computer Co., Ltd., Shibuya-ku, Tokyo (JP)

(72) Inventor: Osamu Nojima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/962,804

(22) Filed: Aug. 8, 2013

(65) Prior Publication Data
US 2014/0047457 A1   Feb. 13, 2014

(30) Foreign Application Priority Data
Aug. 10, 2012  (JP) ................................. 2012-178511

(51) Int. Cl.
| | | |
|---|---|---|
| *A63B 69/36* | (2006.01) | |
| *A63B 24/00* | (2006.01) | |
| *G06T 7/20* | (2006.01) | |
| *G09B 19/00* | (2006.01) | |
| *H04N 5/232* | (2006.01) | |

(52) U.S. Cl.
CPC ......... *A63B 24/0006* (2013.01); *A63B 2220/62* (2013.01); *A63B 2220/30* (2013.01); *A63B 69/36* (2013.01); *G06T 7/20* (2013.01); *G06T 2207/10016* (2013.01); *G06T 2207/30224* (2013.01); *G09B 19/0038* (2013.01); *H04N 5/23229* (2013.01); *H04N 5/23293* (2013.01)

(58) Field of Classification Search
CPC ........... A63B 24/0003; A63B 24/0006; A63B 69/36; A63B 2220/30; A63B 2220/62
USPC ......................................................... 434/252
See application file for complete search history.

(56) References Cited

U.S. PATENT DOCUMENTS

| | | | | |
|---|---|---|---|---|
| 6,821,211 | B2 * | 11/2004 | Otten et al. ................... | 473/219 |
| 8,314,840 | B1 * | 11/2012 | Funk .............................. | 348/157 |
| 2002/0064764 | A1 * | 5/2002 | Fishman et al. ............... | 434/252 |
| 2006/0003300 | A1 * | 1/2006 | Davis ............................. | 434/247 |
| 2006/0166737 | A1 * | 7/2006 | Bentley .......................... | 463/30 |
| 2007/0135255 | A1 * | 6/2007 | Kim et al. ...................... | 475/198 |
| 2009/0042661 | A1 * | 2/2009 | Cheng ............................ | 473/266 |
| 2009/0220124 | A1 * | 9/2009 | Siegel ............................ | 382/103 |

(Continued)

FOREIGN PATENT DOCUMENTS

JP       2010-127639 A       6/2010

OTHER PUBLICATIONS

Blake, S.; Fitzmaurice, D.; Gibbings, T., "Provisional Patent Application For A Golf Swing Recognition And Analysis System", (Jul. 5, 2012), [priority document for and incorporated by reference by US PG Pub. 2014/0018181], pp. 1-19.*

(Continued)

*Primary Examiner* — Brian W Wathen
(74) *Attorney, Agent, or Firm* — Holtz, Holtz, Goodman & Chick PC

(57) ABSTRACT

A data comparison apparatus 1 includes: an image acquisition unit 42 that acquires data of a plurality of motions; an interval identification unit 45 that identifies a predetermined interval that is common in data of the plurality of motions; a time period comparison unit 47 that compares the plurality of motions in the identified predetermined interval; and a notification unit 50 that notifies information corresponding to a comparison result of the time period comparison unit 47.

14 Claims, 14 Drawing Sheets

(56) References Cited

U.S. PATENT DOCUMENTS

| | | | | |
|---|---|---|---|---|
| 2010/0261146 | A1* | 10/2010 | Kim | 434/252 |
| 2011/0118621 | A1* | 5/2011 | Chu | 600/546 |
| 2011/0212791 | A1* | 9/2011 | Ueda et al. | 473/221 |
| 2012/0064764 | A1* | 3/2012 | Islam | 439/578 |
| 2013/0029791 | A1* | 1/2013 | Rose et al. | 473/409 |
| 2014/0018181 | A1* | 1/2014 | Blake et al. | 473/277 |

OTHER PUBLICATIONS

Fujimoto-Kanatani, K., "Determining the essential elements of golf swings used by elite golfers" (Feb. 23, 1995), pp. 1-655 [retrieved from http://ir.library.oregonstate.edu/xmlui/handle/1957/35134].*

Novosel, J., "Tour Temp: Golf's Last Secret Finally Revealed" (2004), Doubleday Publishing, pp. 15-25.*

* cited by examiner

FIG.5

| SETUP TO TOP ||
|---|---|
| TIME DIFFERENCE | INFORMATION |
| DIFFERENCE ≤ -α1 | SWING BACK TOO QUICK<br>SWING BACK MORE SLOWLY |
| -α1 < DIFFERENCE < α2 | SWING BACK WITH IDEAL SPEED |
| DIFFERENCE ≥ α2 | SWING BACK A LITTLE FASTER |

FIG.6

| TOP TO IMPACT ||
|---|---|
| TIME DIFFERENCE | INFORMATION |
| DIFFERENCE ≤ -β1 | VERY GOOD |
| -β1 < DIFFERENCE < β2 | GOOD SWING |
| DIFFERENCE ≥ β2 | SWING SPEED IS NOT ACCELERATING IMMEDIATELY BEFORE IMPACT<br>TRY A LITTLE HARDER |

FIG.7

| IMPACT TO FINISH ||
|---|---|
| TIME DIFFERENCE | INFORMATION |
| DIFFERENCE ≤ -γ1 | VERY GOOD |
| -γ1 < DIFFERENCE < γ2 | GOOD SWING |
| DIFFERENCE ≥ γ2 | TRY A LITTLE HARDER |

FIG.8

| SETUP TO TOP ||
|---|---|
| TIME RATIO | INFORMATION |
| RATIO ≤ 70 % | SWING BACK A LITTLE SLOWER<br>AND KEEP RHYTHM SLOWER |
| 70 % < RATIO < 80 % | GOOD RHYTHM |
| RATIO ≥ 80 % | SWING BACK A LITTLE FASTER<br>AND KEEP RHYTHM FASTER |

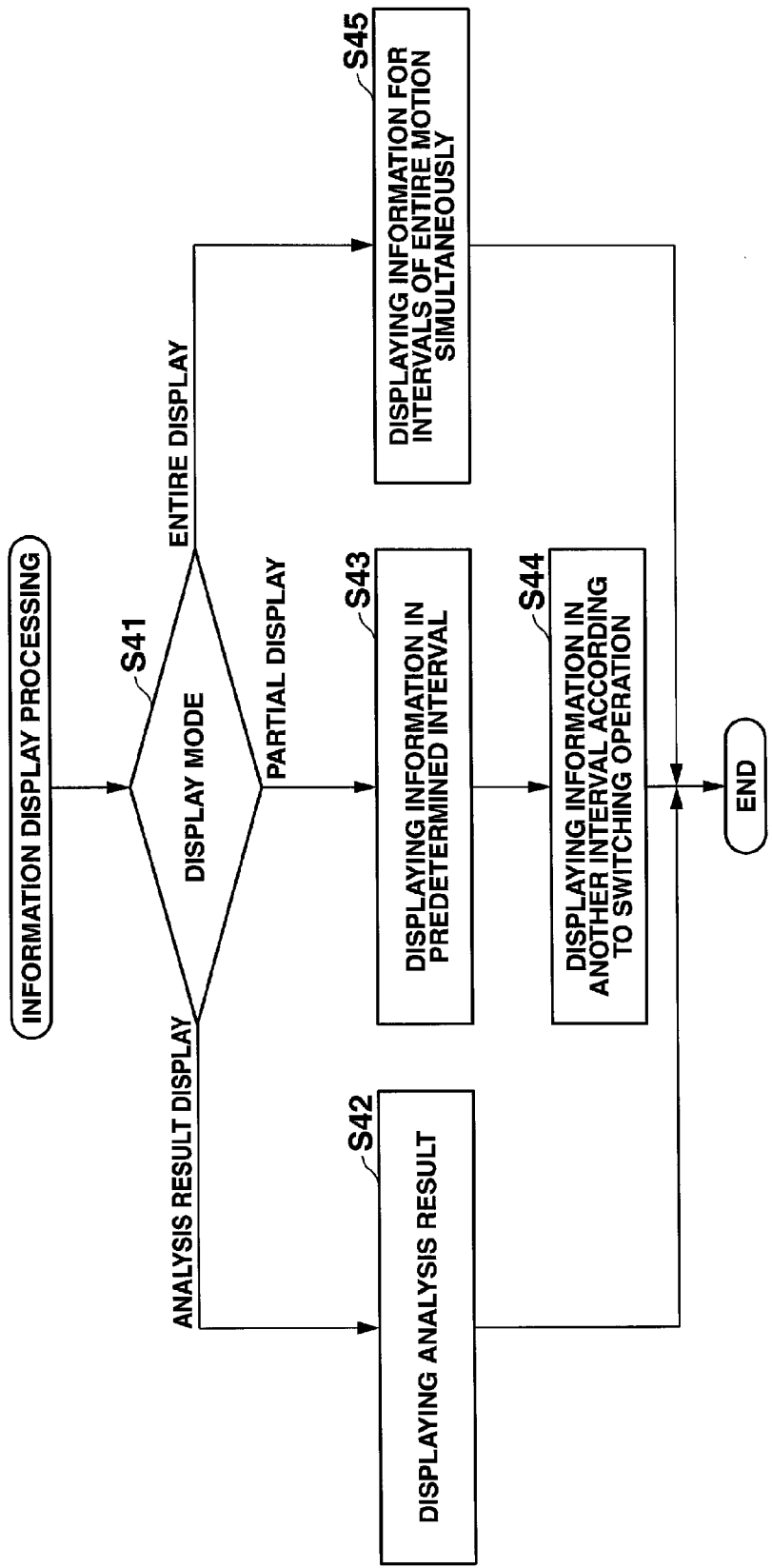

INFORMATION NOTIFICATION APPARATUS THAT NOTIFIES INFORMATION OF DATA OF MOTION

This application is based on and claims the benefit of priority from Japanese Patent Application No. 2012-178511, filed on 10 Aug. 2012, the content of which is incorporated herein by reference.

BACKGROUND OF THE INVENTION

1. Field of the Invention

The present invention relates to an information notification apparatus that notifies information of data of a motion, an information notification method, and a storage medium.

2. Related Art

Conventionally, in Japanese Unexamined Patent Application, Publication No. 2010-127639, a technology has been known which creates a graph showing the time change of speed relating to a sequence of motions, based on data of a moving image in which a subject performing the sequence of motions is photographed.

SUMMARY OF THE INVENTION

An aspect of an information notification apparatus according to the present invention is an information notification apparatus, including:

an acquisition unit that acquires data of a plurality of motions;

an identification unit that identifies a predetermined interval that is common in data of the plurality of motions;

a comparison unit that compares the data of the plurality of motions in the identified predetermined interval; and a notification unit that notifies information corresponding to a comparison result of the comparison unit.

Furthermore, an aspect of an information notification method according to the present invention is an information notification method executed by an information notification apparatus, including:

an acquisition step of acquiring data of a plurality of motions;

an identification step of identifying a predetermined interval that is common in data of the plurality of motions;

a comparison step of comparing the data of the plurality of motions in the identified predetermined interval; and a notification step of notifying information corresponding to a comparison result in the comparison step.

Moreover, an aspect of a storage medium according to the present invention is a storage medium encoded with a computer-readable program that enables a computer to execute functions as:

an acquisition unit that acquires data of a plurality of motions;

an identification unit that identifies a predetermined interval that is common in data of the plurality of motions;

a comparison unit that compares the data of the plurality of motions in the identified predetermined interval; and a notification unit that notifies information corresponding to a comparison result of the comparison unit.

BRIEF DESCRIPTION OF THE DRAWINGS

FIG. 5 shows a information table corresponding to an interval from setup to top;

FIG. 6 shows a information table corresponding to an interval from top to impact;

FIG. 7 shows a information table corresponding to an interval from impact to finish;

FIG. 8 shows a information table corresponding to an interval from setup to top;

FIG. 17 is a flowchart showing a flow of information display processing executed by the data comparison apparatus of FIG. 1 having the functional configuration of FIG. 2.

DETAILED DESCRIPTION OF THE INVENTION

In the following, embodiments of the present invention are explained with reference to the drawings.

Configuration

Figure 1:
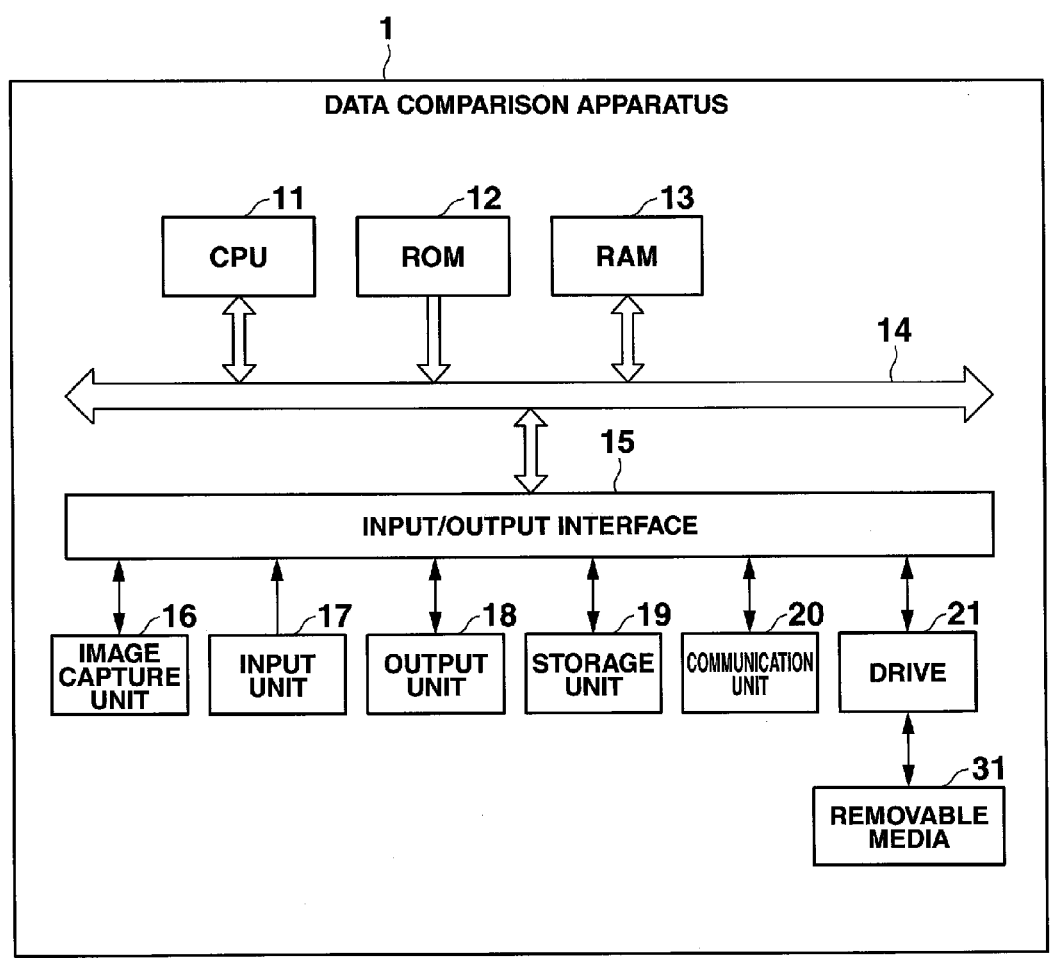
FIG. 1 is a block diagram showing a hardware configuration of a data comparison apparatus according to a first embodiment of the present invention.

FIG. 1 is a block diagram showing a hardware configuration of a data comparison apparatus 1 according to a first embodiment of the present invention.

The data comparison apparatus 1 is configured as, for example, a digital camera.

The data comparison apparatus 1 includes a CPU (Central Processing Unit) 11, ROM (Read Only Memory) 12, RAM (Random Access Memory) 13, bus 14, an Input/Output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor (not illustrated).

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, RAM 13, etc. as appropriate.

Here, in the present embodiment, data of a single captured image is sequentially outputted every ⅟₃₀ seconds, for example, to constitute data of a moving image. In other words, in the following, a captured image refers to a unit image (a frame image, a field image, etc.) constituting a moving image.

The input unit 17 is configured by various buttons and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Figure 2:
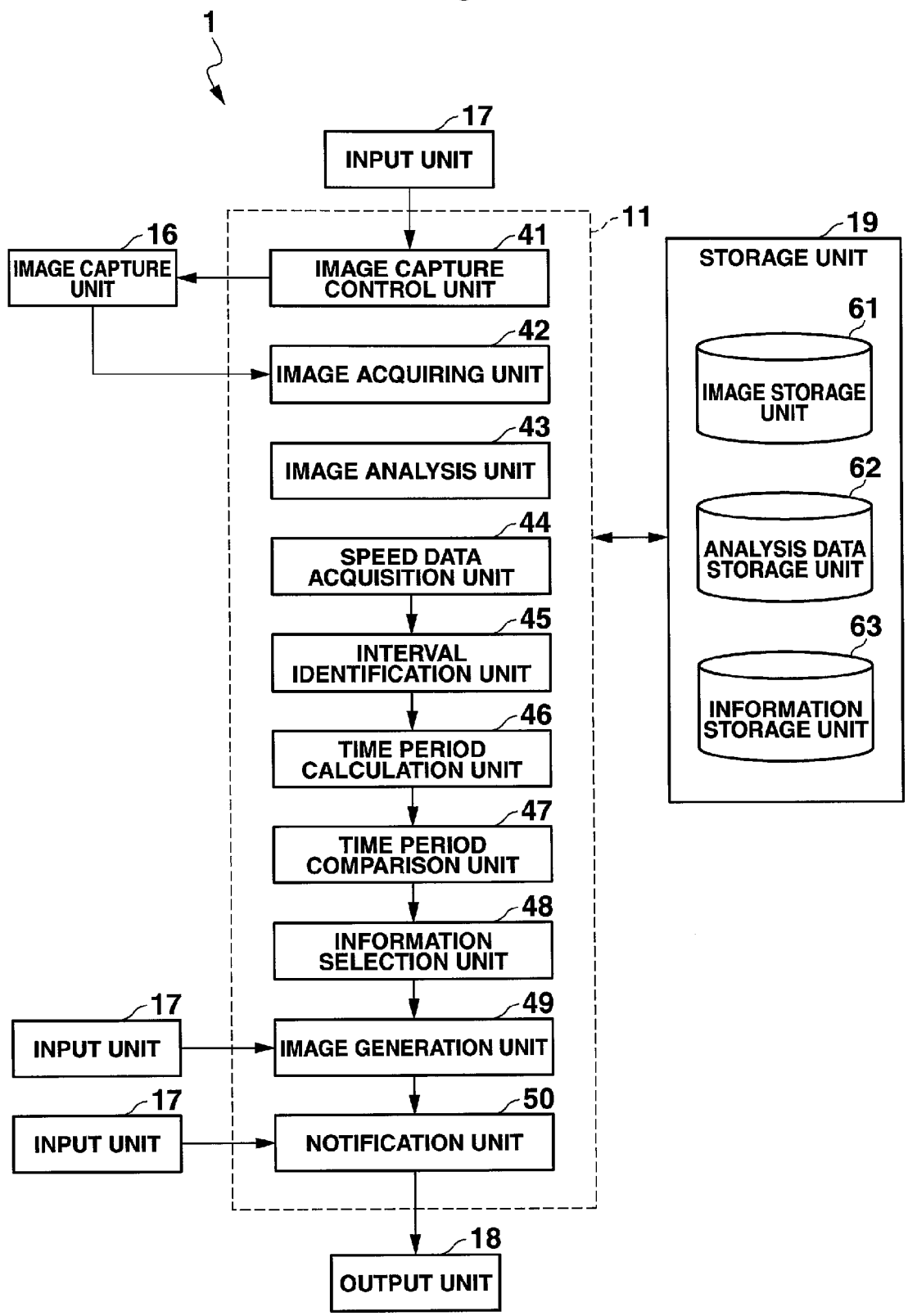
FIG. 2 is a functional block diagram showing a functional configuration for executing notification processing, among the functional configurations of the data comparison apparatus of FIG. 1.

FIG. 2 is a functional block diagram showing a functional configuration for executing notification processing, among the functional configurations of such a data comparison apparatus 1.

The notification processing refers to a sequence of processing of comparing information based on an analysis result of a motion of a subject included in a moving image captured with information based on an analysis result of a motion such as of a person as a target for comparison, and generating and notifying information corresponding to a result thus compared.

In the present embodiment, an example is explained of comparing information based on an analysis result of a golf swing of a player (hereinafter, referred to as "an analysis result from a player") included in a moving image captured by the data comparison apparatus 1 with information based on an analysis result of a golf swing of a professional golfer (hereinafter, referred to as "an analysis result of a professional golfer" set in advance. However, a variety of information can also be compared such as comparing information based on an analysis result of a recent golf swing of a player included in a moving image captured by the data comparison apparatus 1 with information based on an analysis result of a golf swing of the player included in a moving image captured in the past.

When the notification processing is executed, as shown in FIG. 2, an image capture control unit 41, an image acquisition unit 42, an image analysis unit 43, a speed data acquisition unit 44, an interval identification unit 45, a time period calculation unit 46, a time period comparison unit 47, an information selection unit 48, an image generation unit 49, and a notification unit 50 function in the CPU 11.

However, FIG. 2 is merely an example, and at least a part of the functions of the CPU 11 may be imparted to hardware that performs image processing such as a GA (Graphics Accelerator).

When the notification processing is executed, an image storage unit 61, an analysis data storage unit 62, and an information storage unit 63 that are provided as one area of the storage unit 19 are used.

In the image storage unit 61, a moving image (a plurality of images) that is outputted from the image capture unit 16 and acquired by the image acquisition unit 42 is stored.

In the analysis data storage unit 62, data of an analysis result of a player outputted from the image analysis unit 43 (described later) is stored. Furthermore, in the analysis data storage unit 62, data of an analysis result of a professional golfer set in advance (described later) is stored.

In the information storage unit 63, character data for generating data of an image corresponding to an analysis result (described later) is stored.

The image capture control unit 41 sets various image capture conditions inputted via the input unit 17 and controls the operation of image capture at the image capture unit 16.

In the present embodiment, in order to capture a subject (player) who makes a sequence of motions, the image capture control unit 41 causes the image capture unit 16 to capture the subject continuously and outputs as data of a moving image.

The image acquisition unit 42 acquires data of a moving image outputted from the image capture unit 16. Then, the image acquisition unit 42 encodes data of a moving image and stores in the image storage unit 61.

The image analysis unit 43 analyzes an image based on data of a moving image stored in the image storage unit 61. In other words, the image analysis unit 43 sequentially decodes data of a moving image stored in the image storage unit 61 with a captured image as a unit (a unit image) and stores data of a sequence of captured images thus decoded in the RAM 13 to analyze the sequence of captured images. **

More specifically, the image analysis unit 43 extracts data of a captured image group of a motion from the start to the end of a golf swing from among data of a sequence of captured images stored in the RAM 13. This is because there is generally a possibility that data unnecessary for analysis is included such as a motion before the start of a golf swing and a motion after the end of the golf swing in the data of the sequence of a captured image recording the motion of a golf swing.

Next, the image analysis unit 43 specifies a location of an image of a head of a golf club (hereinafter, referred to as "head image") for each data set of the captured image group thus extracted as coordinate data and stores it in the RAM 13. Furthermore, the image analysis unit 43 associates times (hereinafter, referred to as "capturing time") at which each data set of the captured image group thus extracted was captured with coordinate data of the head image and stores it in the RAM 13. Next, the image analysis unit 43 calculates the moving speed of the head image based on the capturing times and the coordinate data sets of the head images stored in the RAM 13 for each of the capturing times and associates every one of the capturing times with the respective moving speeds of the head images, and stores it in the RAM 13.

Furthermore, the image analysis unit 43 stores data in which the capturing times are associated with the respective moving speeds of the head images (hereinafter, referred to as "analysis data") in the analysis data storage 62.

In this way, analysis data as data from an analysis result of a player (hereinafter, referred to as "analysis data of a player") is stored in the analysis data storage unit 62.

It should be noted that analysis data as data from an analysis result of a professional golfer (hereinafter, referred to as "analysis data of a professional golfer") is stored in the analysis data storage unit 62 in advance, as described above.

Figure 3:
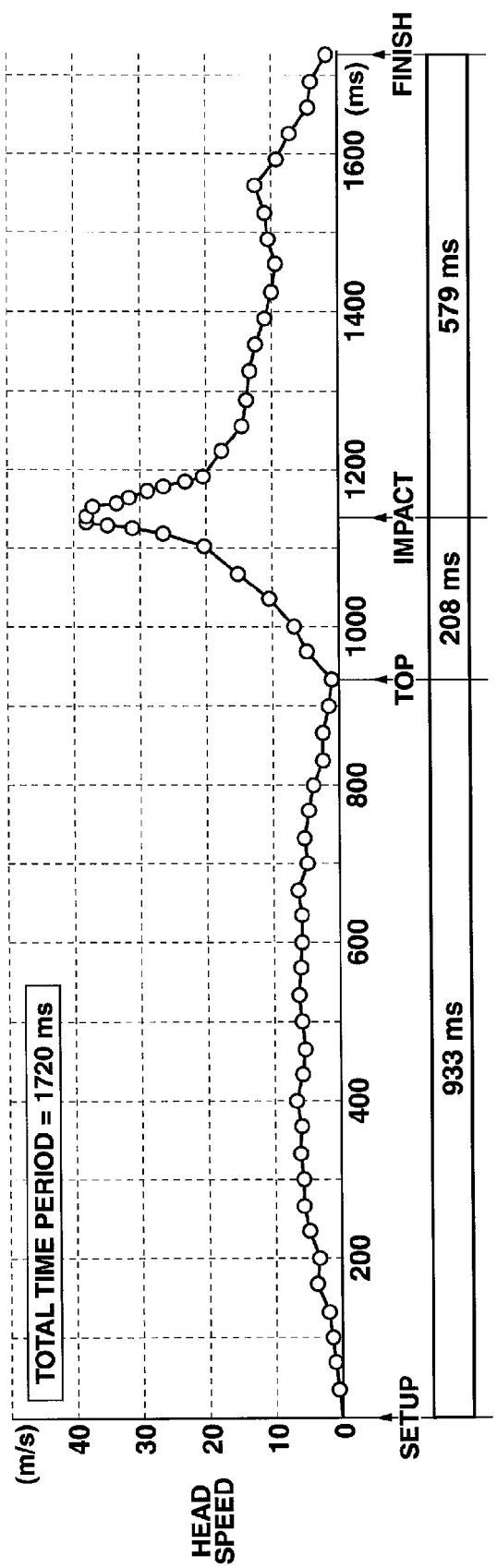
FIG. 3 is a graph of analysis data of a professional golfer.
Figure 4:
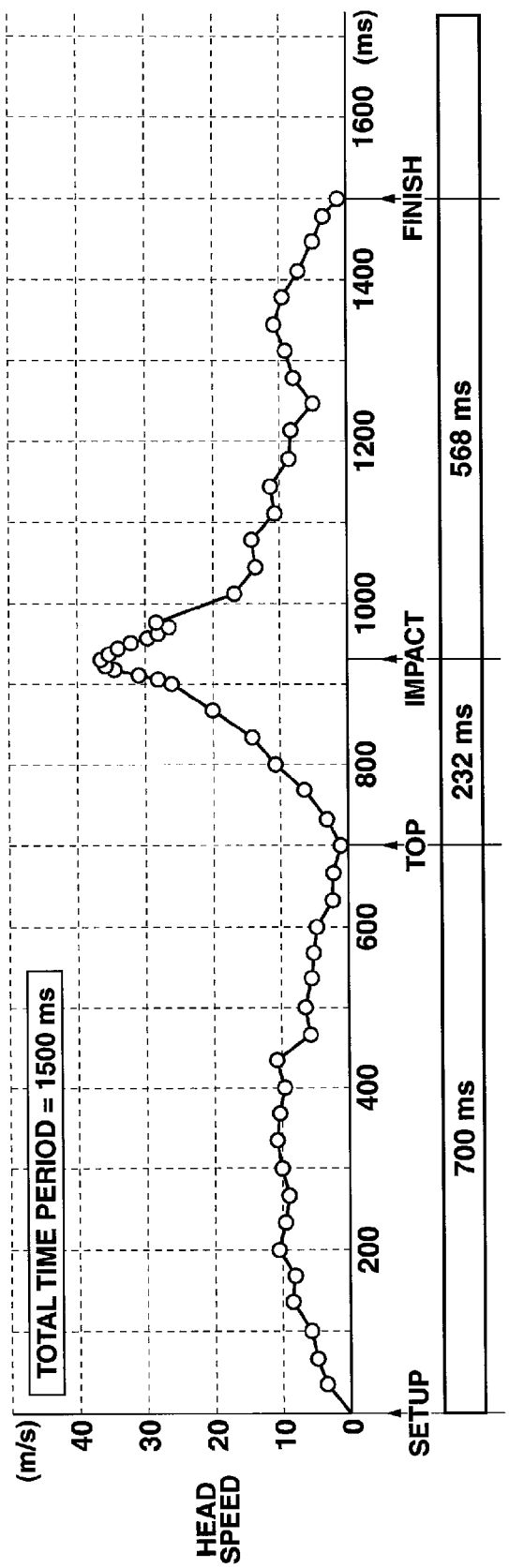
FIG. 4 is a graph of analysis data of a player.

Furthermore, when the analysis data is visualized, a graph is drawn representing a corresponding relationship between the capturing time and the moving speed of the head images, as shown in FIGS. 3 and 4. FIG. 3 is a graph visualizing analysis data of a professional golfer. FIG. 4 is a graph visualizing analysis data of a player.

The speed data acquisition unit 44 reads the analysis data of a player and the analysis data of a professional golfer stored in the analysis data storage unit 62 by the image analysis unit 43 and stores it in the RAM 13.

The interval identification unit 45 identifies three intervals based on the analysis data of a player and the analysis data of a professional golfer stored in the RAM 13 by the speed data acquisition unit 44, respectively. The three intervals include: an interval from setup to top; an interval from top to impact; and an interval from impact to finish. Here, setup refers to a posture at the time of starting swinging a golf club. Top refers to a posture at the time from swinging back the golf club from setup to holding the golf club for a moment. Impact refers to a posture at the time from swinging the golf club down from top to hitting a golf ball. In the present embodiment, the speed of the head of the golf club reaches the maximum at the time of impact. Finish refers to a posture at the time from hitting the golf ball to stopping swinging the head of the golf club.

As shown in FIGS. 3 and 4, the interval at the time from setup to top refers to an interval from the first capturing time among the times at which the moving speed of the head image is zero (hereinafter, referred to as "capturing time 1") to the second capturing time among the times at which the moving speed of the head image is zero (hereinafter, referred to as "capturing time 2"). Furthermore, the interval at the time from top to impact refers to an interval from the capturing time 2 to a capturing time in which the moving speed of the head image reaches the maximum (hereinafter, referred to as a "maximum speed capturing time"). Moreover, the interval from impact to finish refers to an interval from the maximum speed capturing time to the third capturing time among the times at which the moving speed of the head image is zero (hereinafter, referred to as "capturing time 3").

It should be noted that the description of the moving speed being zero herein should not mean that the speed is exactly zero but can include moving speeds that can be recognized as being zero under predetermined criteria for judgment.

The interval identification unit 45 identifies the three intervals based on the capturing times at which the moving speed becomes zero and the maximum speed capturing time, for the analysis data of a player and the analysis data of a professional golf player stored in the RAM 13, respectively.

More specifically, the interval identification unit 45 identifies the interval from the capturing time 1 to the capturing time 2 as the interval from setup to top. Furthermore, the interval identification unit 45 identifies the interval from the capturing time 2 to the maximum speed capturing time as the interval from top to impact. Moreover, the interval identification unit 45 identifies the interval from the maximum speed capturing time to the capturing time 3 as the interval from impact to finish. Furthermore, the interval identification unit 45 associates the starting time and the ending time of capturing times of each interval thus specified with each interval and stores it in the RAM 13.

The time period calculation unit 46 calculates a time period of each interval specified by the interval identification unit 45. More specifically, the time period calculation unit 46 calculates a time period of the interval from setup to top by subtracting a value of the capturing time 1 from a value of the capturing time 2. Furthermore, the time period calculation unit 46 calculates a time in the interval from top to impact by subtracting a value of the capturing time 2 from a value of a capturing time at the maximum speed. Furthermore, the time period calculation unit 46 calculates a time in the interval from impact to finish by subtracting a value of a capturing time at the maximum speed from a value of the capturing time 3.

The time period calculation unit 46 associates a time of each interval thus calculated with each interval and stores it in the RAM 13 as well as in the analysis data storage unit 62. A time in each interval calculated based on the analysis data of a player is associated with the analysis data of a player and stored. Similarly, a time in each interval calculated based on the analysis data of a professional golfer is associated with the analysis data of a professional golfer and stored.

Between a player and a professional golfer, the time period comparison unit 47 compares a time of each interval stored in the RAM 13 by the time period calculation unit 46, and stores a comparison result in the RAM 13. More specifically, the time period comparison unit 47 subtracts a time calculated based on the analysis data of a professional golfer from a time calculated based on the analysis data of a player in each interval, associates a subtracted value as a value of a time difference with each interval, and stores it in the RAM 13.

The information selection unit 48 looks up an information table stored in the information storage unit 63 and selects information corresponding to a value of time difference stored in the RAM 13 by the time period comparison unit 47. The information table refers to a table in which information corresponding to each interval is stored, and more specifically, the information table employed in the present embodiment has a configuration shown in FIGS. 5 to 8. FIG. 5 shows an information table corresponding to the interval from setup to top. FIG. 6 shows an information table corresponding to the interval from top to impact. FIG. 7 shows an information table corresponding to the interval from impact to finish. Although FIG. 8 shows an information table corresponding to the interval from setup to top, it is different from the information table in FIG. 5. It should be noted that $\alpha 1$, $\alpha 2$, $\beta 1$, $\beta 2$, $\gamma 1$, and $\gamma 2$ in FIGS. 5 to 7 are positive integers, respectively.

For example, when explaining with the information table of FIG. 5 as an example, in a case in which a value of time difference is no less than α2, i.e. in a case in which a time period from setup to top of a player is longer by no less than α2, the information selection unit 48 selects a message of "swing back a little faster" as information.

When information is acquired by the information selection unit 48, the image generation unit 49 acquires various data from the analysis data storage unit 62 and the like to generate data of an image. For example, an image employed in the present embodiment includes the modes shown in FIGS. 9 to 12.

Figure 9:
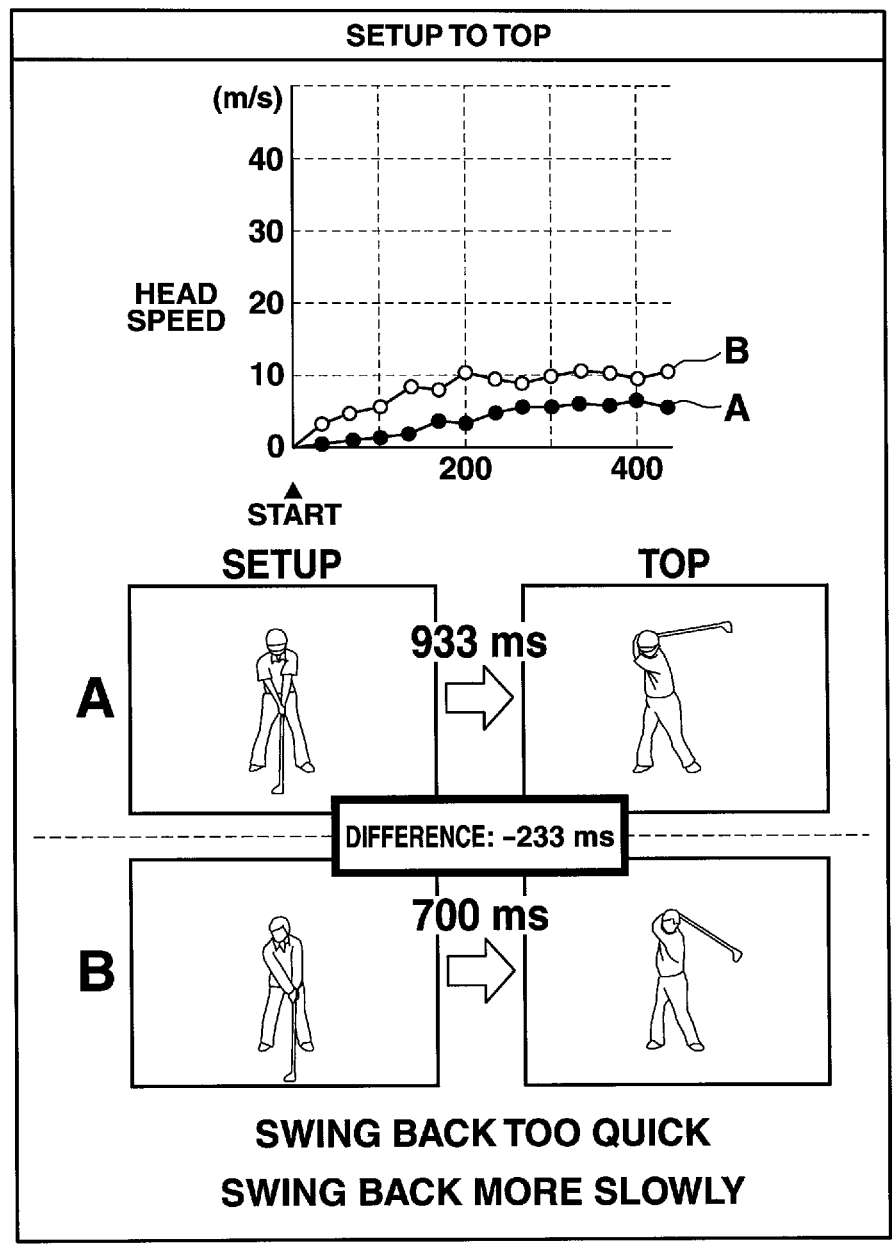
FIG. 9 is a view showing an image corresponding to an interval from setup to top.

FIG. 9 is an image corresponding to the interval from setup to top. This image includes not only information selected by the information selection unit 48 but also a graph of the head speeds of a professional golfer and a player, a time period in each interval such as from setup to top of a professional golfer and a player, and the like.

The image generation unit 49 acquires the analysis data of a professional golfer, the analysis data of a player, and the like from the analysis data storage unit 62 and generates data of an image corresponding to various data acquired and information acquired by the information selection unit 48.

Figure 10:
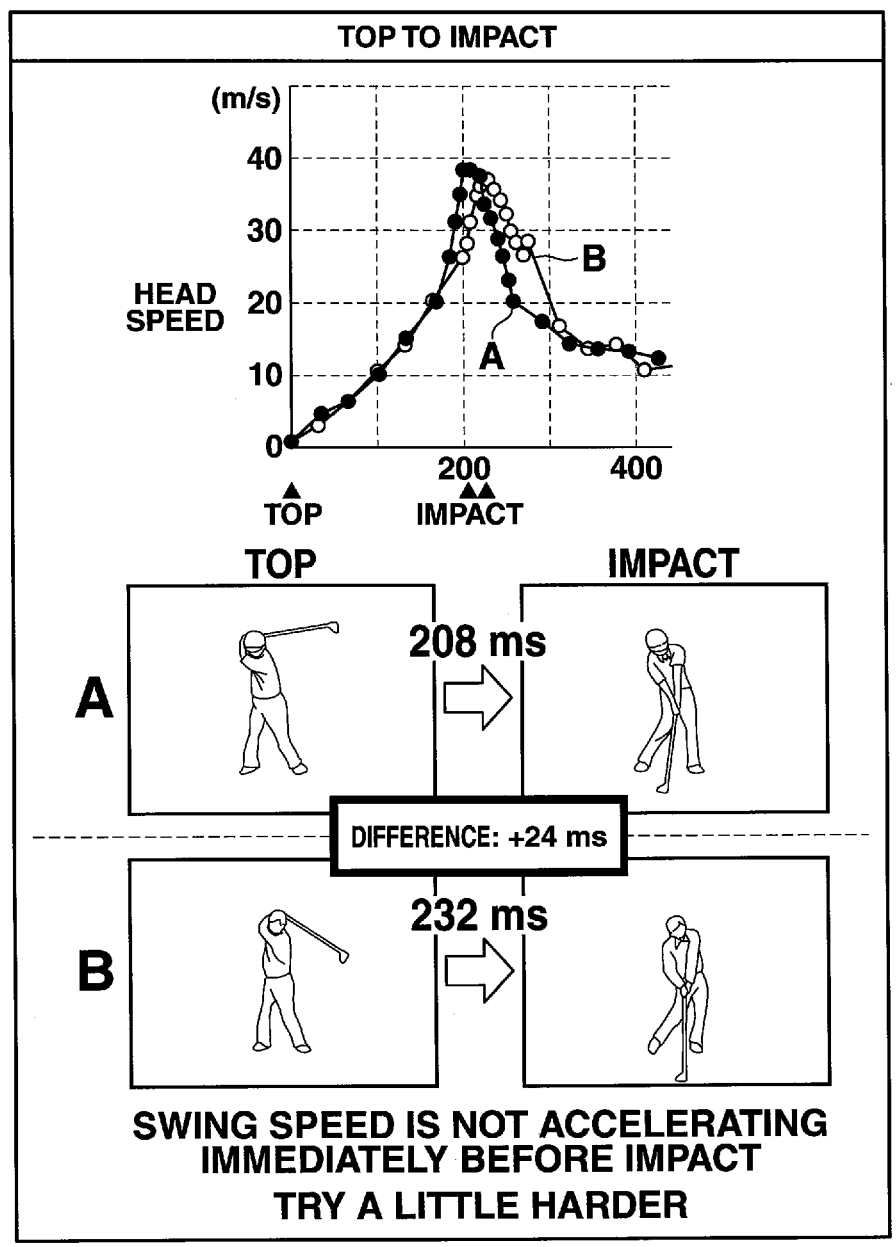
FIG. 10 is a view showing an image corresponding to an interval from top to impact.
Figure 11:
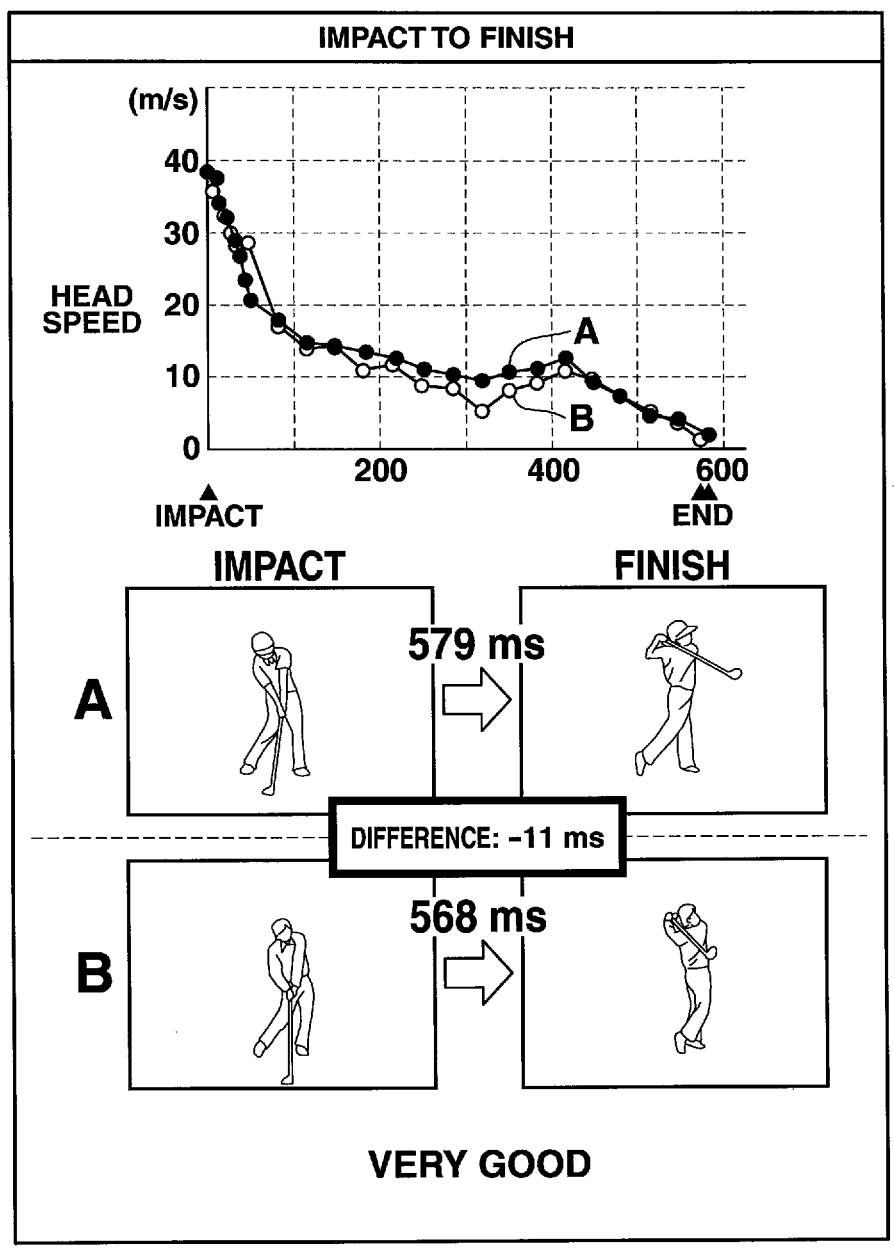
FIG. 11 is a view showing an image corresponding to an interval from impact to finish.

FIG. 10 is an image corresponding to the interval from top to impact, and FIG. 11 is an image corresponding to the interval from impact to finish. Methods for generating data of these images are the same as that for generating the image of FIG. 9.

Figure 12:
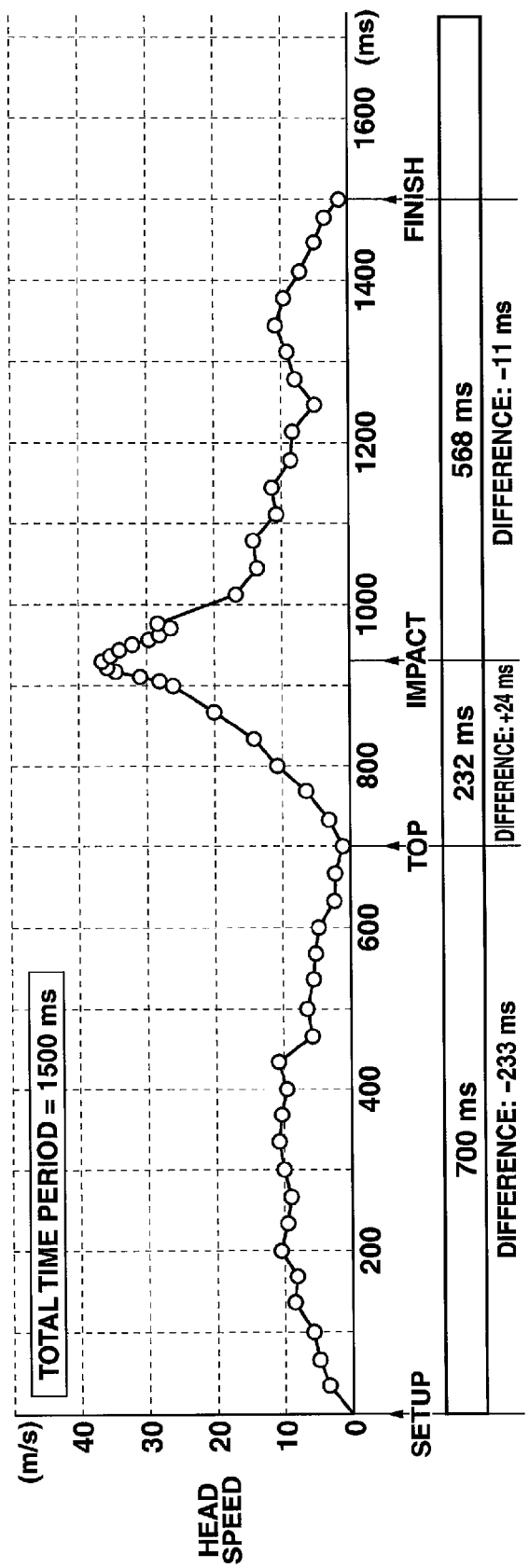
FIG. 12 is an illustration showing a display image of a graph of the head speed of a player and a time period in each interval.

FIG. 12 is an image showing the head speed of a player and a time period in each interval. More specifically, FIG. 12 shows displaying a time period in each interval of a player as well as displaying a time period in each interval of a professional golfer.

The image generation unit 49 acquires the analysis data of a player and the like from the analysis data storage unit 62 and generates data of an image based on various data acquired and a time difference stored in the RAM 13 by the time period comparison unit 47.

It should be noted that the data of images in FIGS. 9 to 12 is generated according to a display mode inputted via the input unit 17. For example, in a case in which the display mode is "analysis result display" (described later), the data of the image shown in FIG. 12 is generated. Furthermore, in a case in which the display mode is "entire display" or "partial display", the data of the images shown in FIGS. 9 to 11 is generated.

The notification unit 50 notifies a user of information included in an image by outputting data of an image generated by the image generation unit 49 from the output unit 18. At this time, in a case in which the display mode is "entire display" (described later), the images shown in FIGS. 9 to 11 are displayed on the output unit 18 all at once. On the other hand, in a case in which the display mode is "partial display" (described later), the images shown in FIGS. 9 to 11 are displayed on the output unit 18 individually. For example, an image corresponding to an interval from setup to top that is the image shown in FIG. 9 is displayed on the output unit first. Then, when detecting an operational input to switch to a subsequent image via the input unit 17, the notification unit 50 causes data of an image corresponding to an interval from top to impact that is the image shown in FIG. 10 to be output from the output unit 18. Similarly, the notification unit 50 then causes data of an image corresponding to an interval from impact to finish that is the image shown in FIG. 11 to be outputted for display from the output unit 18.

Notification Processing

Then, notification processing executed by the data comparison apparatus 1 is explained.

Figure 13:
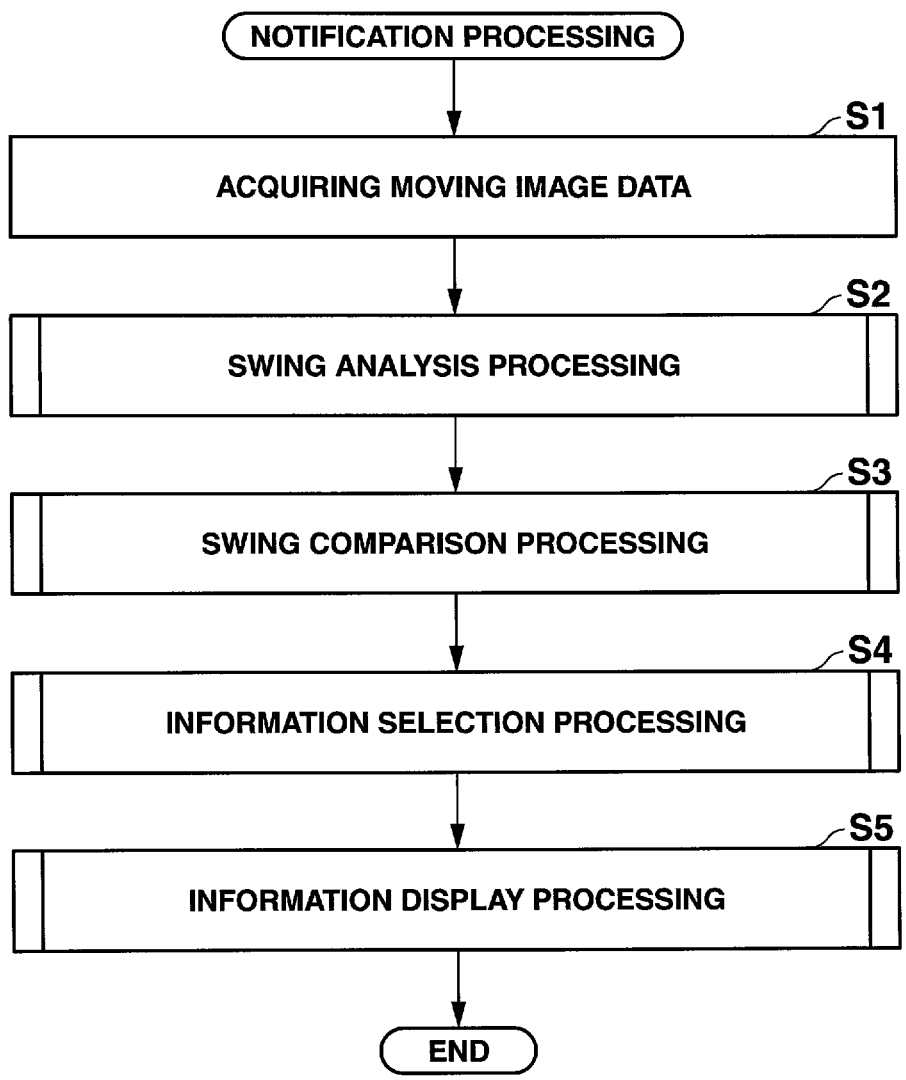
FIG. 13 is a flowchart showing a flow of notification processing executed by the data comparison apparatus of FIG. 1 having the functional configuration of FIG. 2.

FIG. 13 is a flowchart showing an example of a flow of notification processing (main flow) executed by the data comparison apparatus 1 of FIG. 1 having the functional configuration of FIG. 2.

In FIG. 13, when data of a moving image of a subject (player) photographed continuously by the image capture unit 16 is outputted, the following processing of Steps S1 to S5 is executed.

In Step S1, the image acquisition unit 42 acquires data of a moving image outputted from the image capture unit 16. Then, the image acquisition unit 42 encodes the data of a moving image to store it in the image storage unit 61.

Then, in Step S2, the image analysis unit 43 extracts data of a captured image group of a motion of a swing of a golf club at the time from the start to the end based on the data of a moving image acquired in the processing of Step S1, and creates analysis data that is data in which the moving speed of a head image is associated with a capturing time. In the following, such processing in Step S2 by the image analysis unit 43 is referred to as "swing analysis processing" as in the description of FIG. 13. The details of the swing analysis processing are described later with reference to FIG. 14.

Next, in Step S3, the speed data acquisition unit 44 and the like calculates a time period in each interval of a professional golfer and a player based on the analysis data created in the processing of Step S2, and compares the time periods thus calculated for each interval. Then, the comparison result is stored in the RAM 13. Such processing in Step S3 by the speed data acquisition unit 44 and the like is referred to as "swing comparison processing" as in the description of FIG. 13. The details of the swing comparison processing are described later with reference to FIG. 15.

Next, in Step S4, the information selection unit 48 selects information corresponding to a comparison result of the time periods of a professional golfer and a player, stored in the RAM 13 in the processing of Step S3. Such processing in Step S4 by the information selection unit 48 is referred to as "information selection processing" as in the description of FIG. 13. The details of the information selection processing are described later with reference to FIG. 16.

Next, in Step S5, the image generation unit 49 and the like generates data of an image including information selected in the processing of Step S4 to output it from the output unit 18. Such processing in Step S5 by the image generation unit 49 and the like is referred to as "information display processing" as in the description of FIG. 13. The details of the information display processing are described later with reference to FIG. 17.

When the processing of Step S5 ends, the notification processing ends.

Swing Analysis Processing

Next, swing analysis processing executed by the data comparison apparatus 1 is explained.

Figure 14:
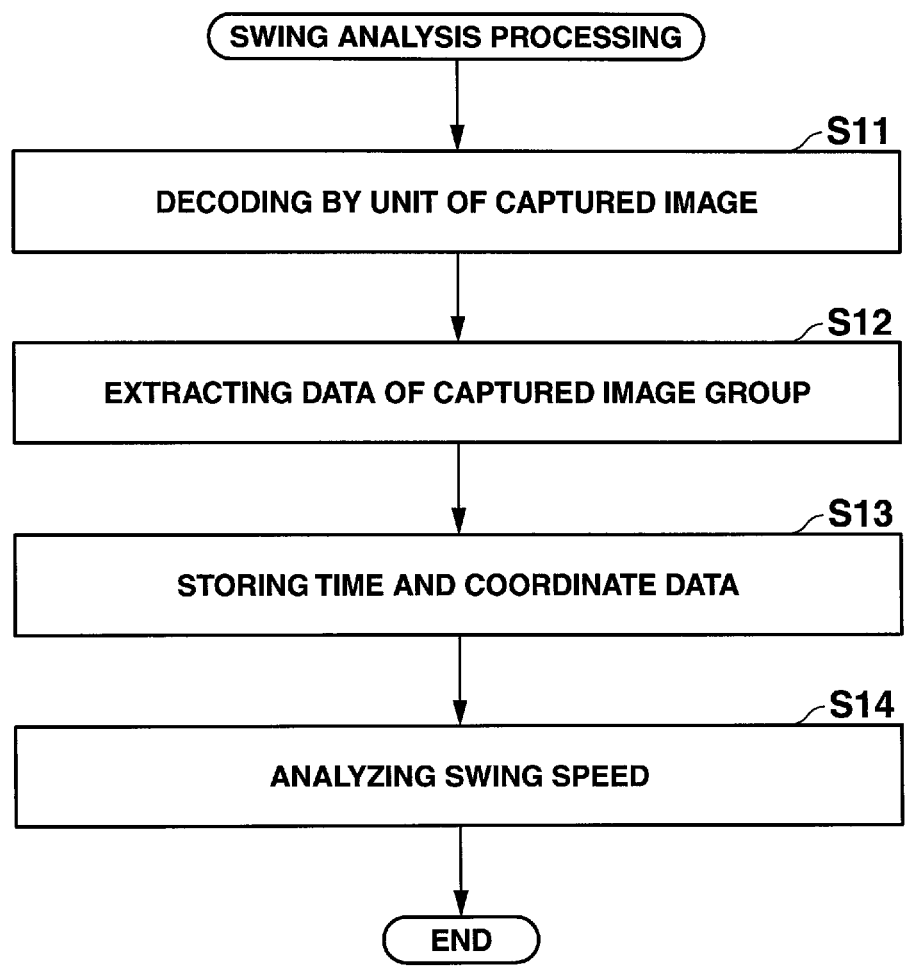
FIG. 14 is a flowchart showing a flow of swing analysis processing executed by the data comparison apparatus of FIG. 1 having the functional configuration of FIG. 2.

FIG. 14 is a flowchart showing an example of a flow of the swing analysis processing (the processing of Step S2 in FIG. 13) executed by the data comparison apparatus 1 of FIG. 1 having the functional configurations of FIG. 2.

In Step S11, the image analysis unit 43 sequentially decodes data of a moving image stored in the image storage unit 61 with a captured image as a unit (a unit image) and stores data of a sequence of captured images thus decoded in the RAM 13.

Next, in Step S12, the image analysis unit 43 extracts data of a captured image group of a motion from the start to the end of a golf swing from among data of a sequence of captured images stored in the RAM 13.

Next, in Step S13, the image analysis unit 43 stores a location of a head image for each data set of the captured image group thus extracted as coordinate data in the RAM 13. Furthermore, the image analysis unit 43 associates times at which each of the captured image groups thus extracted with the coordinate data of the head image and stores it in the RAM 13.

Next, in Step S14, the image analysis unit 43 calculates the moving speed of the head image based on the capturing times and the coordinate data sets of the head images stored in the RAM 13 for each of the capturing times, associates every one of the capturing times with the respective moving speed of the head images, and stores it in the RAM 13.

Furthermore, the image analysis unit 43 stores analysis data that is data in which every one of the capturing times is associated with the respective moving speeds of the head images (hereinafter, referred to as "analysis data") in the analysis data storage unit 62.

When the processing of Step S14 ends, the swing analysis processing ends.

Swing Comparison Processing

Next, swing comparison processing executed by the data comparison apparatus 1 is explained.

Figure 15:
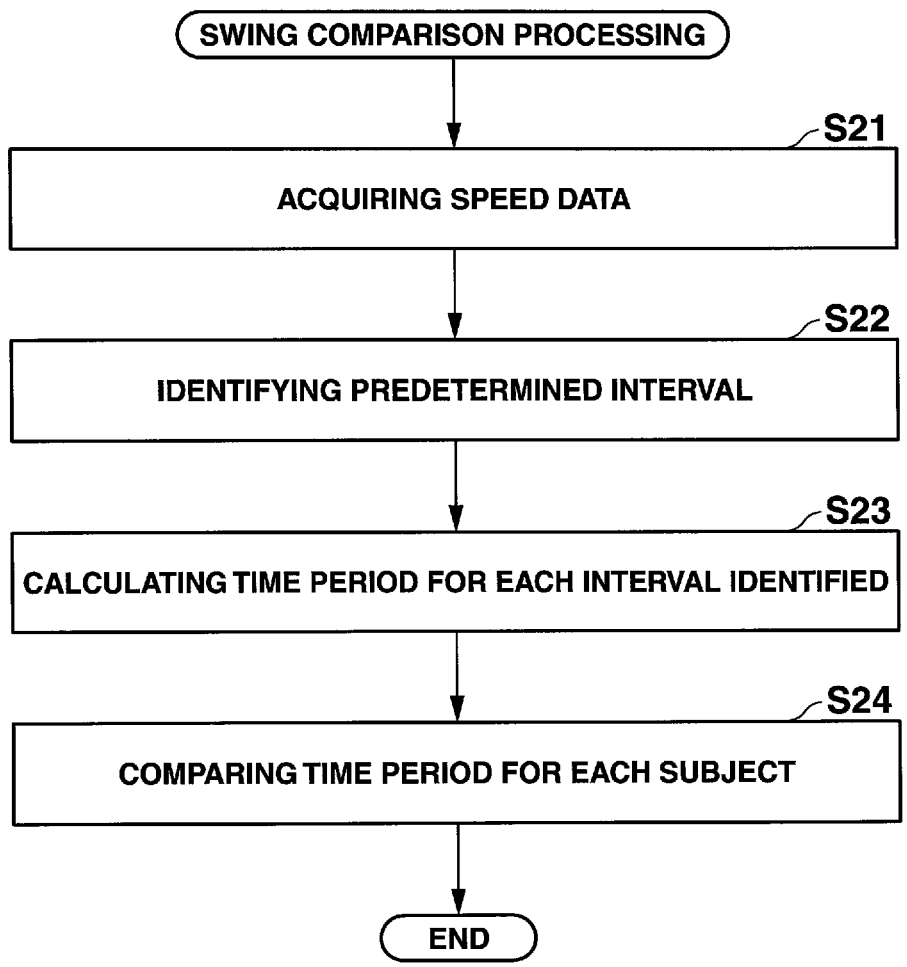
FIG. 15 is a flowchart showing a flow of swing comparison processing executed by the data comparison apparatus of FIG. 1 having the functional configuration of FIG. 2.

FIG. 15 is a flowchart showing an example of a flow of the swing comparison processing (the processing of Step S3 of FIG. 13) executed by the data comparison apparatus 1 of FIG. 1 having the functional configuration of FIG. 2.

In Step S21, the speed data acquisition unit 44 reads the analysis data of a player and the analysis data of a professional golfer stored in the analysis data storage unit 62, and stores it in the RAM 13.

Next, in Step S22, the interval identification unit 45 identifies three intervals based on the analysis data of a player and the analysis data of a professional golfer stored in the RAM 13 in Step S21, respectively. The three intervals include: an interval from the time of setup to the time of top; an interval from the time of top to the time of impact; and an interval from the time of impact to the time of finish. Furthermore, the interval identification unit 45 associates the starting time and the ending time of a capturing time in each interval thus specified with each interval, and stores it in the RAM 13.

Next, in Step S23, the time period calculation unit 46 calculates a time period of each interval specified in Step S22. Furthermore, the time period calculation unit 46 associates every one of the times thus calculated with the respective intervals, and stores it in the RAM 13. Furthermore, the time period calculation unit 46 associates every one of the times thus calculated with the respective intervals, and stores it in the analysis data storage unit 62. A time in each interval calculated based on the analysis data of a player is associated with the analysis data of a player and stored. Similarly, a time period in each interval calculated based on the analysis data of a professional golfer is associated with the analysis data of a professional golfer and stored.

Next, in Step S24, between a player and a professional golfer, the time period comparison unit 47 compares a time of each interval stored in the RAM 13 in Step S23, and stores a comparison result in the RAM 13. More specifically, the time period comparison unit 47 subtracts a time calculated based on the analysis data of a professional golfer from a time calculated based on the analysis data of a player in each interval, associates a subtracted value as a value of a time difference with each interval and stores it in the RAM 13.

When the processing of Step S24 ends, the swing comparison processing ends.

Information Selection Processing

Next, information selection processing executed by the data comparison apparatus 1 is explained.

Figure 16:
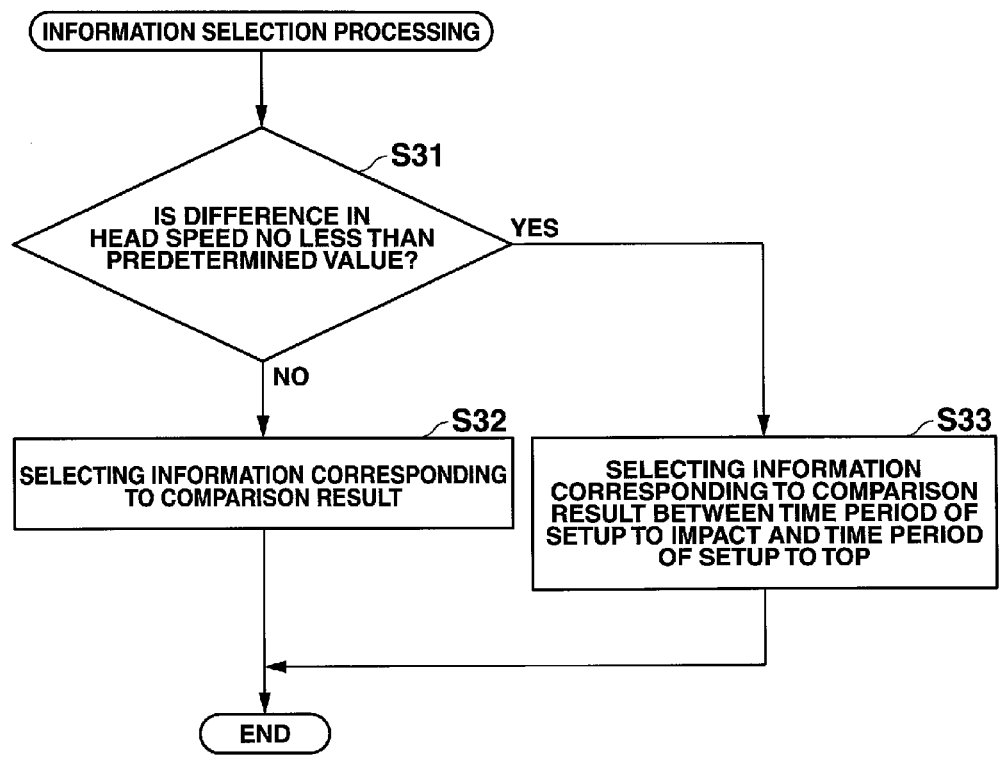
FIG. 16 is a flowchart showing a flow of information selection processing executed by the data comparison apparatus of FIG. 1 having the functional configuration of FIG. 2.

FIG. 16 is a flowchart showing an example of a flow of information selection processing (the processing of Step S4 in FIG. 13) executed by the data comparison apparatus 1 of FIG. 1 having the functional configuration of FIG. 2.

In Step S31, the information selection unit 48 determines whether the difference in speed of the club head at the time of impact between a professional golfer and a player is no less than a predetermined value. In a case in which the difference in speed of the club head between the professional golfer and the player is less than a predetermined value, a NO determination is made and the processing advances to Step S32.

In Step S32, the information selection unit 48 references an information table stored in the information storage unit 63 and selects information corresponding to a value of time difference stored in the RAM 13 in Step S24. At this time, the information selection unit 48 references an information table corresponding to each interval for each interval identified in Step S22 and selects information.

When the processing of Step S32 ends, the information selection processing ends.

On the other hand, in Step S31, in a case in which the difference in speed of the club head between the professional golfer and the player is no less than a predetermined value, a YES determination is made and the processing advances to Step S33. In a case in which the difference in speed of the club head between the professional golfer and the player is no less than a predetermined value, contents of information is changed for the interval from the time of setup to the time of top, as compared to the case in which the difference in speed of the club head between the professional golfer and the player is less than a predetermined value.

In Step S33, the information selection unit 48 calculates the ratio between the time period from the time of setup to the time of impact of a player and the time period from the time of setup to the time of top and references the information table shown in FIG. 8 to select information corresponding to the ratio thus calculated. The ratio is calculated as: (time period from the time of setup to the time of top)/(time period from the time of setup to the time of impact).

For example, in a case of the ratio being no more than 70%, information of "SWING BACK A LITTLE SLOWER AND KEEP SLOWER RHYTHM" is selected.

With such a configuration, it is possible to check the rhythm of a player's swing even when it is difficult to compare swings between players in a case in which the difference in speed of the club head between the professional golfer and the player is no less than a predetermined value.

When the processing of Step S33 ends, the information selection processing ends.

Information Display Processing

Next, information display processing executed by the data comparison apparatus 1 is explained.

FIG. 17 is a flowchart showing an example of a flow of information display processing (the processing of Step S5 in FIG. 13) executed by the data comparison apparatus 1 of FIG. 1 having the functional configuration of FIG. 2.

In Step S41, in a case in which the display mode inputted via the input unit 17 is "analysis result display", the image generation unit 49 advances the processing to Step S42.

In Step S42, the image generation unit 49 acquires the analysis data of a player and the like from the analysis data storage unit 62 and generates data of the image shown in FIG. 12 based on various data acquired and a time difference stored in the RAM 13 by the time period comparison unit 47.

When data of an image is generated by the image generation unit 49, the notification unit 50 outputs the data of an image thus generated from the output unit 18.

With such a configuration, it is possible for a user to check the speed of the club head for a sequence of motions from setup through finish as well as to check a time period in each interval and the difference in time in each interval between a player and a professional golfer.

When the processing of Step S42 ends, the information display processing ends.

In Step S41, in a case in which the display mode inputted via the input unit 17 is "partial display", the image generation unit 49 advances the processing to Step S43.

In Step S43, the image generation unit 49 acquires the analysis data of a professional golfer and the analysis data of a player and the like from the analysis data storage unit 62 and generates data of the images shown in FIGS. 9 to 11 for each interval based on various data acquired and information acquired by the information selection unit 48.

When data of an image is generated by the image generation unit 49, the notification unit 50 outputs the data of an image corresponding to the interval from setup to top that is the image shown in FIG. 9 from the output unit 18.

In Step S44, when detecting an operational input to switch to a subsequent image via the input unit 17, the notification unit 50 causes data of an image corresponding to an interval from top to impact that is the image shown in FIG. 10 to be output from the output unit 18. When detecting an operational input to switch to a subsequent image via the input unit 17, the notification unit 50 causes data of an image corresponding to an interval from impact to finish that is the image shown in FIG. 11 to be output from the output unit 18.

With such a configuration, since it is possible to check information on a single screen for a single interval, the information is easily viewable in a case of a screen being small, for example.

When the processing of Step S44 ends, the information display processing ends.

In Step S41, in a case in which the display mode inputted via the input unit 17 is "entire display", the image generation unit 49 advances the processing to Step S45.

In Step S45, the image generation unit 49 generates data of the images shown in FIGS. 9 to 11 for each interval, similarly to the processing of Step S43.

When data of an image is generated by the image generation unit 49, the notification unit 50 outputs the data of an image corresponding to all of the intervals that are the images shown in FIGS. 9 to 11.

With such a configuration, since it is possible to check notification information on a single screen for all of the intervals, convenience improves.

When the processing of Step S45 ends, the information display processing ends.

The present invention is not limited to the abovementioned example in a case in which the display mode is "partial display", and so long as the data of an image outputted is the data of the images shown in FIGS. 9 to 11 in Step S43, it may be any data of an image. Furthermore, it may be configured to transition to any image in Step S44. For example, it may be configured so that the notification unit 50 outputs data of an image that a user desires to the output unit 18 by way of a selection operation of a user via the input unit 17.

The embodiments of the present invention are described above.

The data comparison apparatus 1 executing such notification processing above includes the speed data acquisition unit 44, the time period comparison unit 47, and the notification unit 50.

The speed data acquisition unit 44 acquires analysis data of a player and analysis data of a professional golfer.

Between the player and the professional golfer, the time period comparison unit 47 compares information relating to the analysis data of the player and the analysis data of the professional golfer acquired by the speed data acquisition unit 44.

The notification unit 50 notifies information corresponding to a comparison result in a predetermined interval based on the comparison result by the time period comparison unit 47.

Therefore, such a data comparison apparatus 1 can notify information made by efficiently using analysis data relating to a sequence of motions of a plurality of subjects.

Furthermore, the data comparison apparatus 1 includes the interval identification unit 45.

The interval identification unit 45 identifies a predetermined interval corresponding to a predetermined motion in a swing of the golf club based on the analysis data of the player and the analysis data of the professional golfer acquired by the speed data acquisition unit 44.

Between the player and professional golfer, the time period comparison unit 47 compares information relating to the analysis data of the player and the analysis data of the professional golfer acquired by the speed data acquisition unit 44 for a predetermined interval identified by the interval identification unit 45.

Therefore, such a data comparison apparatus 1 can notify information in a predetermined interval by using analysis data relating to the sequence of motions of the plurality of subjects efficiently.

Furthermore, the data comparison apparatus 1 further includes the information storage unit 63 and the information selection unit 48.

The interval identification unit 45 identifies a plurality of predetermined intervals corresponding to a predetermined motion.

Between the player and the professional golfer, the time period comparison unit 47 compares information relating to the analysis data of the player and the analysis data of the professional golfer acquired by the speed data acquisition unit 44 in each of the plurality of predetermined intervals specified.

The information storage unit 63 associates a plurality of types of information corresponding to the comparison results obtained by the time period comparison unit 47 with a plurality of predetermined intervals, respectively and stores it.

The information selection unit 48 selects information corresponding to the predetermined interval from among the plurality of types of information based on the comparison result by the time period comparison unit 47.

The notification unit 50 notifies information corresponding to the predetermined interval selected by the information selection unit 48.

Therefore, such a data comparison apparatus 1 can notify various information for each of the predetermined intervals properly by using analysis data relating to a sequence of motions of a plurality of subjects efficiently.

Furthermore, the data comparison apparatus 1 further includes the time period calculation unit 46.

The time period calculation unit 46 calculates a time period of a predetermined motion in a predetermined interval identified by the interval identification unit 45.

Between the player and the professional golfer, the time period comparison unit 47 compares a time period of a predetermined interval thus calculated as information relating to a predetermined motion.

Therefore, such a data comparison apparatus 1 can notify information based on a time period of a predetermined interval.

The notification unit 50 displays analysis data in a predetermined interval as well as notification information.

Therefore, since such a data comparison apparatus 1 can notify an analysis result of a motion in addition to the notification information, it is possible to use the analysis data relating to a sequence of motions of a plurality of subjects efficiently.

Data of a sequence of motions relating to a subject is data of the speed of a swing of the head of a golf club.

Therefore, such a data comparison apparatus 1 can notify an analysis result based on the speed of a motion in addition to the notification information.

It should be noted that the present invention is not to be limited to the aforementioned embodiment, and that modifications, improvements, etc. within a scope that can achieve the object of the present invention are also included in the present invention.

For example, the following modified embodiments can be considered.

Modified Embodiment 1

In the information selection processing in the abovementioned embodiment, although the notification information described in FIGS. 5 to 8 is displayed in modes such as in FIGS. 9 to 11, the notification information may be outputted as sound from the output unit 18.

With such a configuration, it is possible to save space for displaying the notification information, for example, and furthermore, a user can concentrate on visually checking data of a swing of a club among the displayed examples such as in FIGS. 9 to 11.

Modified Embodiment 2

Although the notification unit 50 is configured so as to check a time in each interval and a time difference in each interval between a player and a professional golfer by outputting the data of a image of FIG. 12 from the output unit 18 by the image generation unit 49 in Step S42, it may also be configured to notify a difference in rhythm of a swing between a player and a professional golfer by outputting sound in place of displaying the time difference.

In this case, it is configured that the difference of rhythm of a swing between a player and a professional golfer is notified by outputting sound at each feature point of "top, impact, finish" in a swing of a golf club for both a player and a professional golfer, for example.

Furthermore, in this case, along with changing tone at each feature point, it is possible to notify a user of the difference in rhythm of a swing in an easily understood manner by changing the tone at each feature point of the respective swings of a player and a professional golfer.

Furthermore, along with outputting sound at each feature point during the swing of a player and the swing of a professional golfer, it may be configured to notify an analysis result of a swing by sound corresponding to a gap range of each feature point between the swing of a player and the swing of a professional player.

Furthermore, although the cases of applying the present invention are described with the data of a moving image in which the swing of a golf club is photographed as a target in the abovementioned embodiments, for example, the present invention can be applied for comparison of various motions. For example, the present invention can be applied for comparison of motions such as the swing of a baseball bat, the swing of a tennis racket, choreography, and the like.

In the aforementioned embodiments, a digital camera has been described as an example of the data comparison apparatus 1 to which the present invention is applied; however, the present invention is not particularly limited thereto.

For example, the present invention can be applied to any electronic device in general having an image processing function. More specifically, for example, the present invention can be applied to a lap-top personal computer, a printer, a television, a video camera, a portable navigation device, a cell phone device, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the data comparison apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An information notification apparatus comprising a processor which is operable to function as:
   an acquisition unit that acquires a first piece of motion data indicative of a plurality of partial motions of a first subject;
   an identification unit that identifies a first time period, having a first time length, in the first piece of motion data;
   a comparison unit that compares (i) the first piece of motion data of the first subject in the first time period and (ii) a second piece of motion data indicative of a plurality of partial motions of a second subject, the second piece of motion data including a second time period having a second time length, by subtracting one of the first and second time lengths from the other of the first and second time lengths; and
   a notification unit that performs notification of information corresponding to a comparison result of the comparison unit.

2. The information notification apparatus according to claim 1, wherein:
   the identification unit identifies a plurality of types of predetermined time periods corresponding to the respective partial motions included in the first piece of motion data, wherein each of the plurality of types of predetermined time periods has a respective first time length, and wherein the second piece of motion data has the plurality of types of predetermined time periods corresponding to the respective partial motions included in the second piece of motion data and having respective second time lengths;
   the comparison unit compares, for each of the plurality of types of predetermined time periods, the first piece of motion data and the second piece of motion data, by subtracting one of the first and second time lengths from the other of the first and second time lengths, for each of the plurality of types of predetermined time periods; and
   the notification unit performs notification of plural pieces of information corresponding to respective ones of the plurality of types of predetermined time periods.

3. The information notification apparatus according to claim 2, further comprising a storage that stores the plural pieces of information corresponding to respective comparison results of the comparison unit in association with respective ones of the plurality of types of predetermined time periods;
   wherein the processor is further operable to function as a selection unit that selects the plural pieces of information corresponding to respective ones of the plurality of types of predetermined time periods from among a plurality of types of information stored in the storage, based on the comparison results of the comparison unit, and
   wherein the notification unit performs notification of the plural pieces of information corresponding to the respective ones of the plurality of types of predetermined time periods having been selected.

4. The information notification apparatus according to claim 3, wherein the notification unit displays on a display the first and second pieces of motion data in respective ones of the plurality of types of predetermined time periods as well as the plural pieces of information corresponding to respective ones of the comparison results.

5. The information notification apparatus according to claim 4, wherein the processor is further operable to function as a selection unit that selects a display mode for displaying one of the plural pieces of information corresponding to the respective ones of the comparison results, and
   wherein the notification unit displays on the display, in accordance with the selected display mode, the one of the plural pieces of information corresponding to respective ones of the comparison results.

6. The information notification apparatus according to claim 5, wherein the selection unit selects, as the display mode, one of:
   displaying an analysis result of the first piece of motion data;
   displaying information of a predetermined time period; and
   displaying information of all predetermined time periods of the first piece of motion data.

7. The information notification apparatus according to claim 2, wherein the notification unit displays on a display one of the plural pieces of information corresponding to any type of predetermined time period from among the plurality of types of predetermined time periods.

8. The information notification apparatus according to claim 7, wherein the processor is further operable to function as a detection unit that detects an instruction for switching display of information corresponding to one type of predetermined time period to display of information corresponding to another type of predetermined time period from among the plurality of types of predetermined time periods, and
   wherein, in response to the detection unit detecting the instruction, the notification unit switches from displaying the information corresponding to the one type of predetermined time period on the display to displaying the information corresponding to the another type of predetermined time period on the display.

9. The information notification apparatus according to claim 1, wherein the first piece of motion data comprises a series of speed data of a head of a golf club.

10. The information notification apparatus according to claim 1, wherein a content of the information notified by the notification unit changes based on a time difference between the first and second time lengths obtained by the comparison unit.

11. The information notification apparatus according to claim 1, wherein the second piece of motion data is measured at a time different from a time at which the first piece of motion data is measured.

12. The information notification apparatus according to claim 1, wherein the notification unit performs notification of the information corresponding to the comparison result of the comparison unit by displaying, on a display, advice data regarding the first piece of motion data.

13. An information notification method executed by an information notification apparatus, the method comprising:
   acquiring a first piece of motion data indicative of a plurality of partial motions of a subject;
   identifying a first time period, having a first time length, in the first piece of motion data;
   comparing (i) the first piece of motion data of the first subject in the first time period and (ii) a second piece of motion data indicative of a plurality of partial motions of a second subject, the second piece of motion data including a second time period having a second time length, by subtracting one of the first and second time lengths from the other of the first and second time lengths; and performing notification of information corresponding to a comparison result of the comparing.

14. A non-transitory computer-readable storage medium having a program that is executable to control a computer to function as:

an acquisition unit that acquires a first piece of motion data indicative of a plurality of partial motions of a first subject;

an identification unit that identifies a first time period, having a first time length, in the first piece of motion data;

a comparison unit that compares (i) the first piece of motion data of the first subject in the first time period and (ii) a second piece of motion data indicative of a plurality of partial motions of a second subject, the second piece of motion data including a second time period having a second time length, by subtracting one of the first and second time lengths from the other of the first and second time lengths; and a notification unit that performs notification of information corresponding to a comparison result of the comparison unit.

* * * * *